United States Patent [19]

Jinnai

[11] 4,358,775
[45] Nov. 9, 1982

[54] INK JET PRINTING APPARATUS

[75] Inventor: Koichiro Jinnai, Tokyo, Japan

[73] Assignee: Ricoh Company, Ltd., Tokyo, Japan

[21] Appl. No.: 171,696

[22] Filed: Jul. 24, 1980

[30] Foreign Application Priority Data

Jul. 28, 1979 [JP] Japan .................................. 54-96542
Jul. 28, 1979 [JP] Japan .................................. 54-96543

[51] Int. Cl.³ ...................... G01D 15/18; G01D 18/00
[52] U.S. Cl. ..................................................... 346/75
[58] Field of Search .......................................... 346/75

[56] References Cited

U.S. PATENT DOCUMENTS 3,750,191  7/1973  Naylor .................................. 346/75
3,769,630 10/1973  Hill ...................................... 346/75
3,969,733  7/1976  DeMoss ............................ 346/75 X

*Primary Examiner*—Joseph W. Hartary
*Attorney, Agent, or Firm*—David G. Alexander

[57] ABSTRACT

An ink jet is ejected from an ink jet head ($1_1$) at a constant frequency of pressure oscillation and separates into ink droplets at a certain position. A pulsating electric field is applied to the droplets at the separation position to charge the same where it is desired to print a dot on a sheet (PR), the charged droplets being electrostatically deflected onto the sheet (PR), whereas uncharged droplets are trapped by a gutter (GA). The phase of the pressure oscillation is initially progressively shifted until a charge detector (21) detects a charged condition of the droplets and then latched at that phase. A single charging electrode (41) and a single charge detecting electrode (21) may be used for several ink jet heads ($1_1$, $1_2$, $1_3$) if a separate phase of charging voltage is provided for each respective ink jet head ($1_1$, $1_2$, $1_3$) and the phases are alternatingly applied. A plurality of the latter described units may be provided in a row with ink jet heads in corresponding positions all being operated with the same charging voltage phase.

2 Claims, 11 Drawing Figures

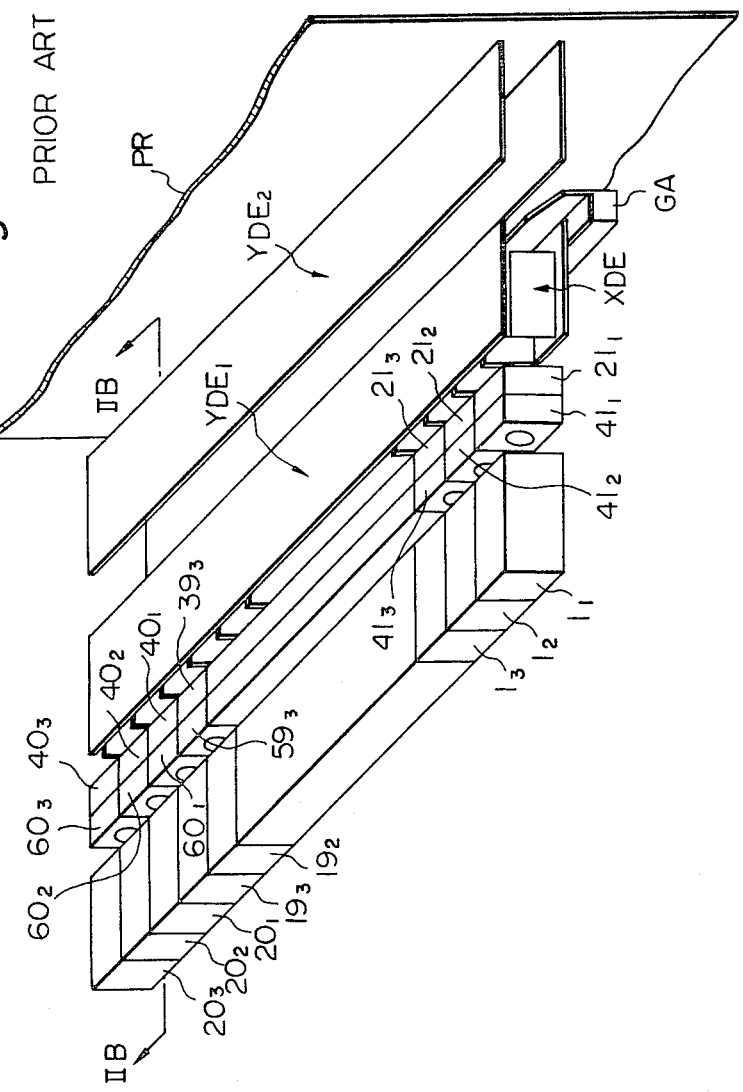

INK JET PRINTING APPARATUS

BACKGROUND OF THE INVENTION

The present invention relates to an ink jet printing or recording apparatus comprising means for causing an ink ejection nozzle to eject pressurized ink having a determined frequency of pressure oscillation, charging ink droplets by means of a charging electrode at a position where the ejected ink separates into droplets, and guiding the charged ink droplets onto a recording sheet or a gutter for printing. More particularly, the present invention is concerned with a method of setting the timing for charging the ink droplets.

Various types of ink jet recording apparatus have been proposed (e.g. IBM Technical Disclosure Bulletin, Vol. 16, No. 12 (May 1974) pages 3877 and 3878 Japanese Patent Publication No. 47-43450 and Japanese Unexamined Patent Publication No. 50-46450). In a recording apparatus of the type described, if the timing for forming an ink droplet and that for applying a charging voltage (pulse) to the charging electrode deviate from each other, the ink droplet fails to receive a desired amount of charge and becomes displaced on the sheet from a desired position causing distortion of the reproduced image. This problem has heretofore been coped with by searching for a proper charging phase and thereby properly determining the timing for applying a charging voltage to the charging electrode. Such expedients are disclosed in Japanese Patent Publication No. 47-43450 and Unexamined Publication No. 50-60131 for example.

According to the conventional techniques for setting the charging timing, the charge on an ink droplet is detected by means of a charge detecting electrode by progressively shifting the phase of a search pulse which has a shorter period than a charging pulse. After the proper search pulse phase has been determined, the phase of a recording charge pulse (having a period longer than that of the search pulse) is set so that its substantially intermediate portion coincides with the search pulse. Then the recording operation is initiated. Such a procedure, where a plurality of ink ejection nozzles are arranged to perform multi-spot simultaneous recording, requires one charge detecting electrode and one charging electrode for each nozzle. The charge detecting electrodes and charging electrodes cannot be easily installed and must be shielded to avoid mutual interference. Moreover, large numbers of charge detection circuits and charge control circuits must be installed in one-to-one relation with the charging electrodes and charge detecting electrodes. Another drawback is that, since the individual heads have different phases of separation of ink into droplets, it is difficult to synchronize them with print data.

SUMMARY OF THE INVENTION

An ink jet printing apparatus embodying the present invention includes an ink jet head for ejecting a jet of pressurized ink at a predetermined frequency of pressure oscillation so that the ink jet separates into droplets at a predetermined position, charging electrode means for applying a pulsating electric field to the droplets at said position and charge detecting means for detecting charges on the droplets, and is characterized by comprising control means for controlling the ink jet head to progressively shift a time phase of separation of the ink jet into droplets relative to the pulsating electric field and latch the time phase at a present value when the charge detecting means detects a charged condition of the ink droplets.

In accordance with the present invention, an ink jet is ejected from an ink jet head at a constant frequency of pressure oscillation and separates into ink droplets at a certain position. A pulsating electric field is applied to the droplets at the separation position to charge the same where it is desired to print a dot on a sheet, the charged droplets being electrostatically deflected onto the sheet whereas uncharged droplets are trapped by a gutter. The phase of the pressure oscillation is initially progressively shifted until a charge detector detects a charged condition of the droplets and then latched at that phase. A single charging electrode and a single charge detecting electrode may be used for several ink jet heads if a separate phase of charging voltage is provided for each respective ink jet head and the phases are alternatingly applied. A plurality of the latter described units may be provided in a row with ink jet heads in corresponding positions, all being operated with the same charging voltage phase.

It is an object of the present invention to provide an ink jet printing apparatus which minimizes the required number of charging electrodes.

It is another object of the present invention to provide an ink jet printing apparatus which minimizes the required number of charge detecting electrodes.

It is another object of the present invention to provide an ink jet printing apparatus which may be manufactured easier and at lower cost than comparable apparatus known heretofore but operates in a reliable and efficient manner.

It is another object of the present invention to provide a generally improved ink jet printing apparatus.

Other objects, together with the foregoing, are attained in the embodiments described in the following description and illustrated in the accompanying drawing.

BRIEF DESCRIPTION OF THE DRAWING

FIG. 1a is a perspective view of a conventional ink jet recording apparatus;

FIG. 1b is a section on a line IB—IB of FIG. 1a;

FIGS. 3a-1 to 3a-3 are combined to constitute a block diagram of an operation control circuit of the ink jet recording apparatus of the present invention;

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Referring to FIG. 1a, there is illustrated a known ink jet recording arrangement which includes 60 ink jet heads $1_1, 1_2, 1_3, 2_1, 2_2, 2_3, 3_1, \ldots 20_3$. Nozzles of these heads eject pressurized ink at a predetermined frequency of pressure oscillation using electrostrictive vibrators. Droplets of the ejected ink are charged by corresponding charging electrodes $41_1, 41_2, 41_3, 42_1, 42_2, 42_3, \ldots 60_3$ and then deflected horizontally by x-axis deflecting electrodes XDE (60 sets). With this type of design, 60 charge detecting electrodes $21_1, 21_2, 21_3, 22_1, 22_2, 22_3, 23_1, \ldots 40_3$ must be positioned in one-to-one relation with the ink jet heads. The apparatus of FIG. 1a further includes a first Y-axis deflecting electrode $YDE_1$ adapted to deflect charged ink droplets above a gutter GA, and a second Y-axis deflecting electrode $YDE_2$ for causing the charged ink droplets deflected by the electrode $YDE_1$ to impinge on the surface of a recording sheet PR.

Figure 1B:
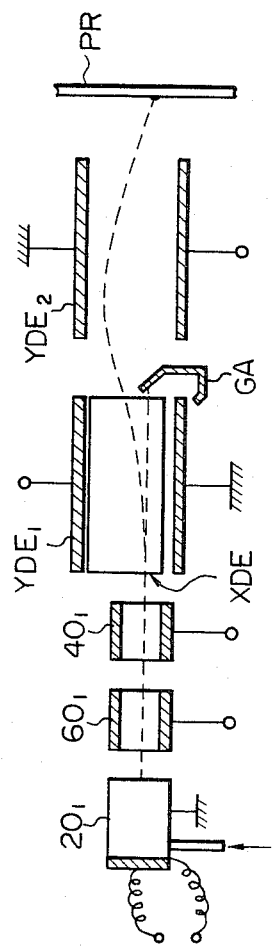

FIG. 1b is a section on a line IB—IB of FIG. 1a. As shown, each of the first and second Y-axis electrodes $YDE_1$ and $YDE_2$ is applied with a predetermined deflection voltage. Non-charged ink droplets will not be effected by the deflection electric field ($YDE_1$) and therefore will hit the gutter GA. Charged droplets will fly over the gutter GA to impinge on the recording sheet PR. Each set of the X-axis deflecting electrodes XDE is also applied with a given level of deflecting electric field while each of the charging electrodes $41_1$–$60_3$ is applied with a charging voltage which periodically rises in a stepwise manner. Thus, charged droplets of ink are deflected horizontally in a stepwise manner. Where the heads $1_1$–$20_3$ are arranged at a common spacing of 5 mm and it is desired to record data at a horizontal density of 8 dots/mm, a plurality of ink droplets ejected from one head and charged are deflected horizontally in $5 \times 8 = 40$ steps by the X-axis deflecting electrode XDE. As a result, data is recorded at the picture element density of 8 dots/mm over a horizontal range of $5 \times 60 = 300$ mm.

The spacing of the charge detecting electrodes $21_1$–$40_3$ and that of the charging electrodes $41_1$–$60_3$ are also 5 mm. Such a spacing leaves only small areas available for shielding the neighboring electrodes so that difficulty is experienced in preventing mutual interference between the charge detecting electrodes $21_1$–$40_3$, which detect small amounts of charge, and also in attenuating noise. An additional effort must be made to shield the leads associated with the charge detecting electrodes. These shortcomings cannot be overcome as long as use is made of the conventional charge timing setting method which as discussed above searches for a proper charging phase for each of the ejection nozzles.

Figure 2A:
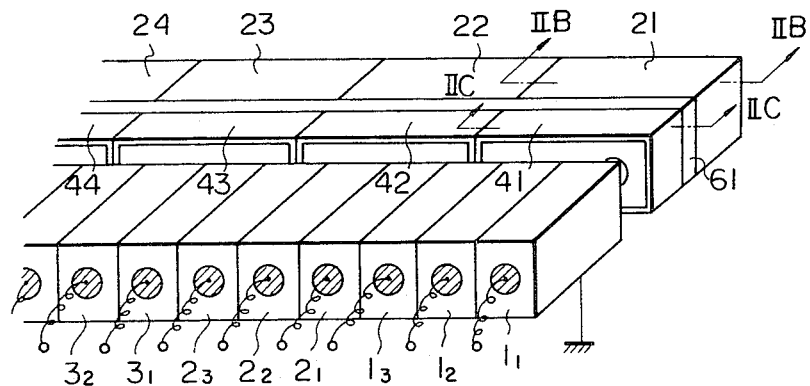
FIG. 2a shows in perspective a major structural part of an ink jet recording apparatus embodying the present invention.
Figure 2B:
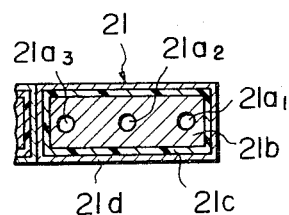
FIGS. 2b and 2c are sections along lines IIB—IIB and IIC and IIC of FIG. 2a, respectively.
Figure 2C:
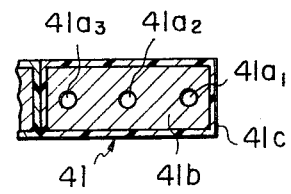

The present invention will hereinafter be described with reference to the drawing, with like elements designated by the same reference numerals. Shown in FIG. 2a is the array of ink jet or ejection heads $1_1, 1_2, 1_3, 2_1, 2_2, 2_3, 3_1, 3_2, 3_3, \ldots 20_3$, an array of charge detecting electrodes 21–40 and an array of charging electrodes 41–60 adapted to embody the present invention in a preferable manner. FIG. 2b is a section on a line IIB—IIB of FIG. 2a while FIG. 2c is a section on a line IIC—IIC of FIG. 2a.

As indicated in FIG. 2b, the charge detecting electrode 21 comprises a conductive block 21b formed with apertures $21a_1$–$21a_3$ at the same spacing (5 mm) as the ink ejection nozzles and adapted to pass droplets of ejected ink therethrough. The conductive block 21b is covered with an insulating layer 21c which is in turn covered with a conductive shield layer 21d. The other electrodes 22–40 for charge detection are constructed in exactly the same way. The electrodes 21–40 are bonded to the back of an insulating plate 61. The charging electrode 41 has a conductive block 41b formed with apertures $41a_1$–$41a_3$ at the same spacing as the ink ejection nozzles for the passage of ink droplets. An insulating layer 41c covers the outer periphery of the insulative block 41b. The other charging electrodes 42–60 are common in structure to the electrode 41. The charging electrodes 41–60 are bonded to the front of the insulator plate 61. If desired, the charging electrodes 41–60 may have a structure similar to that of the charge detecting electrodes 21–40.

Figures 1, 3A:
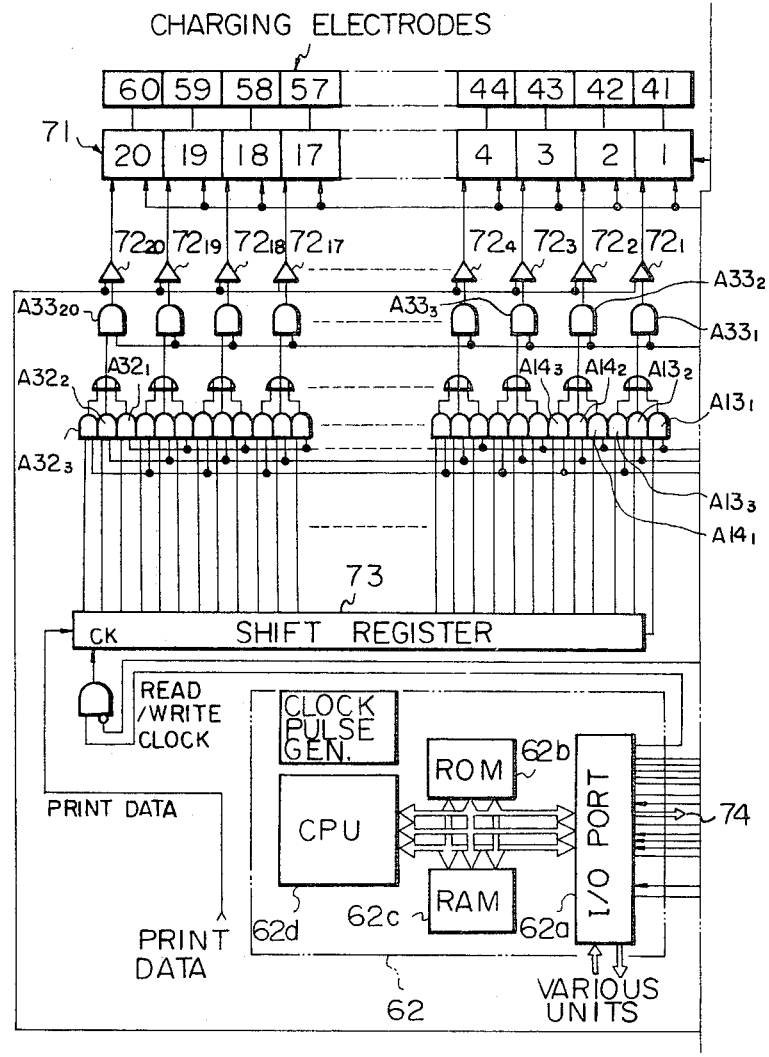
Figures 2, 3A:
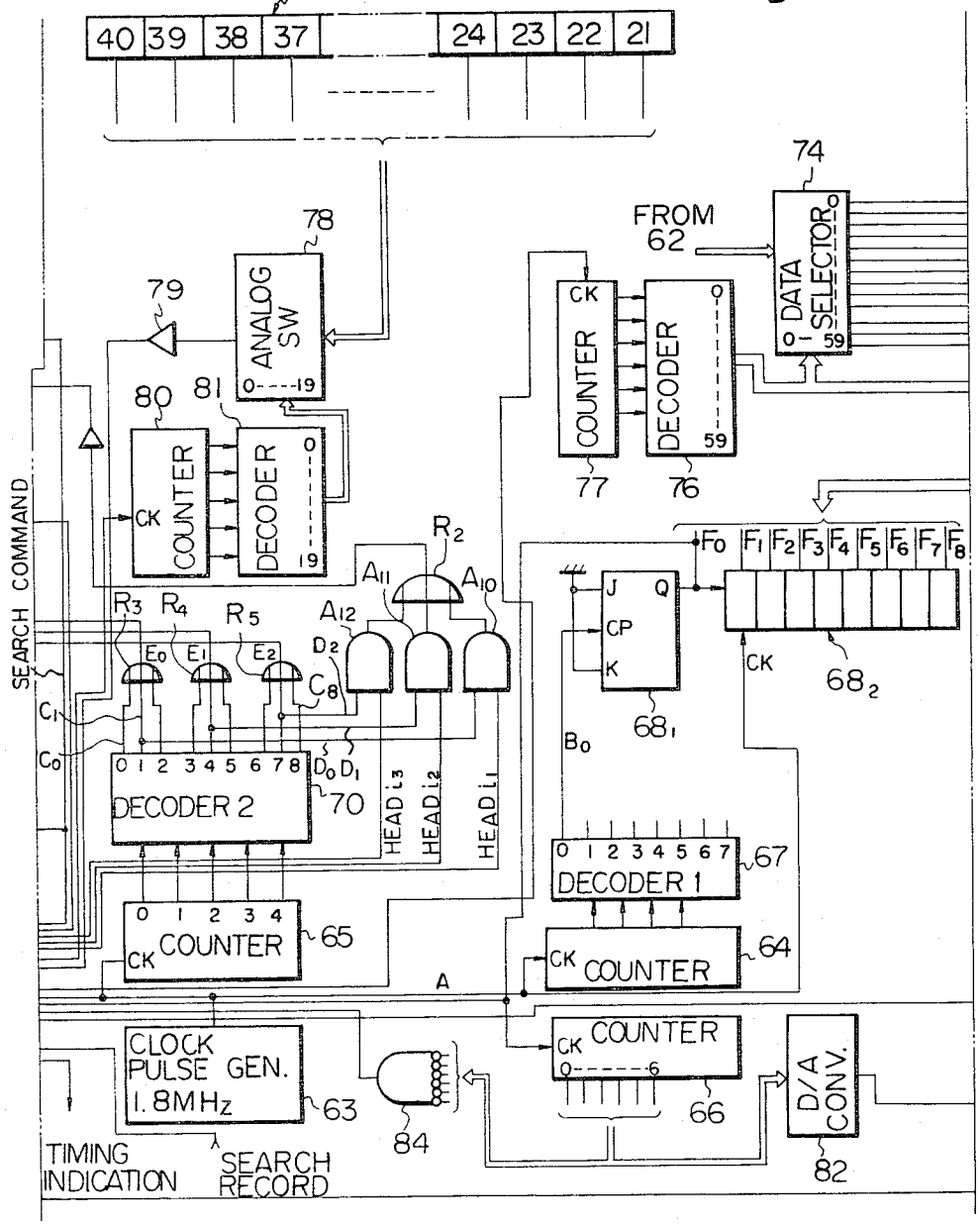
FIG. 3a is a diagram illustrating how
Figures 3, 3A:
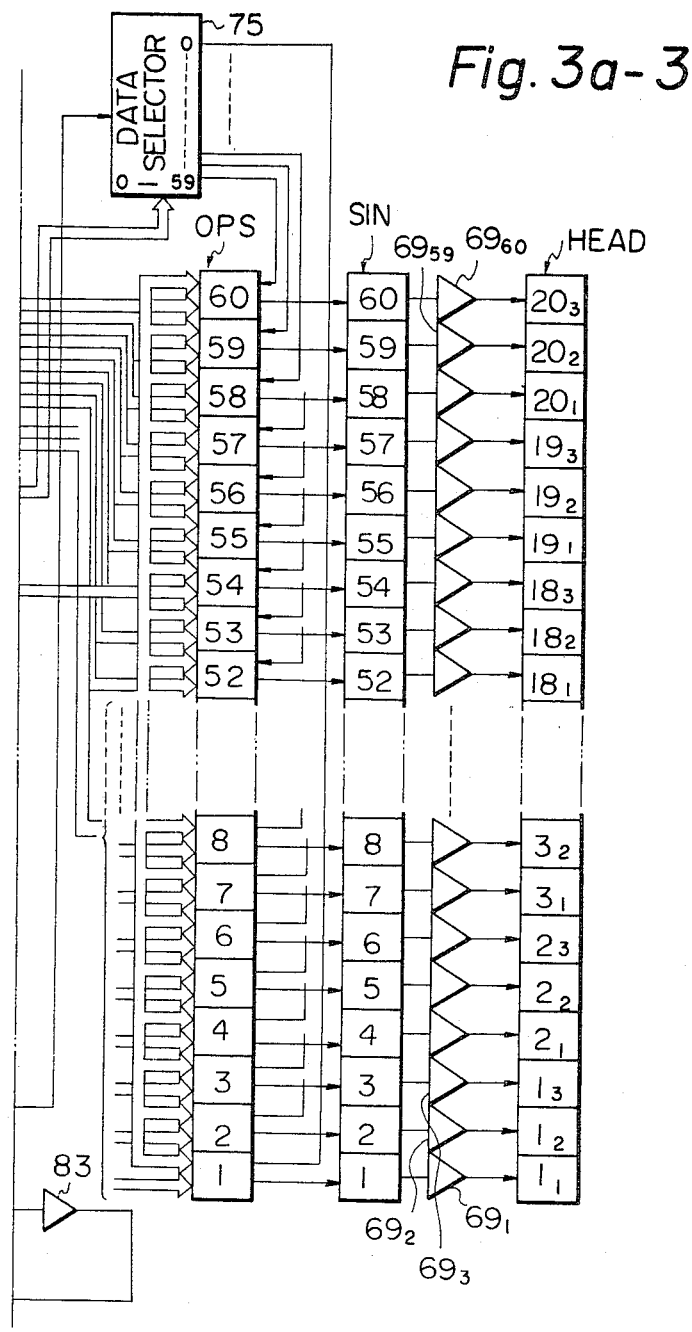
Figure 3B:
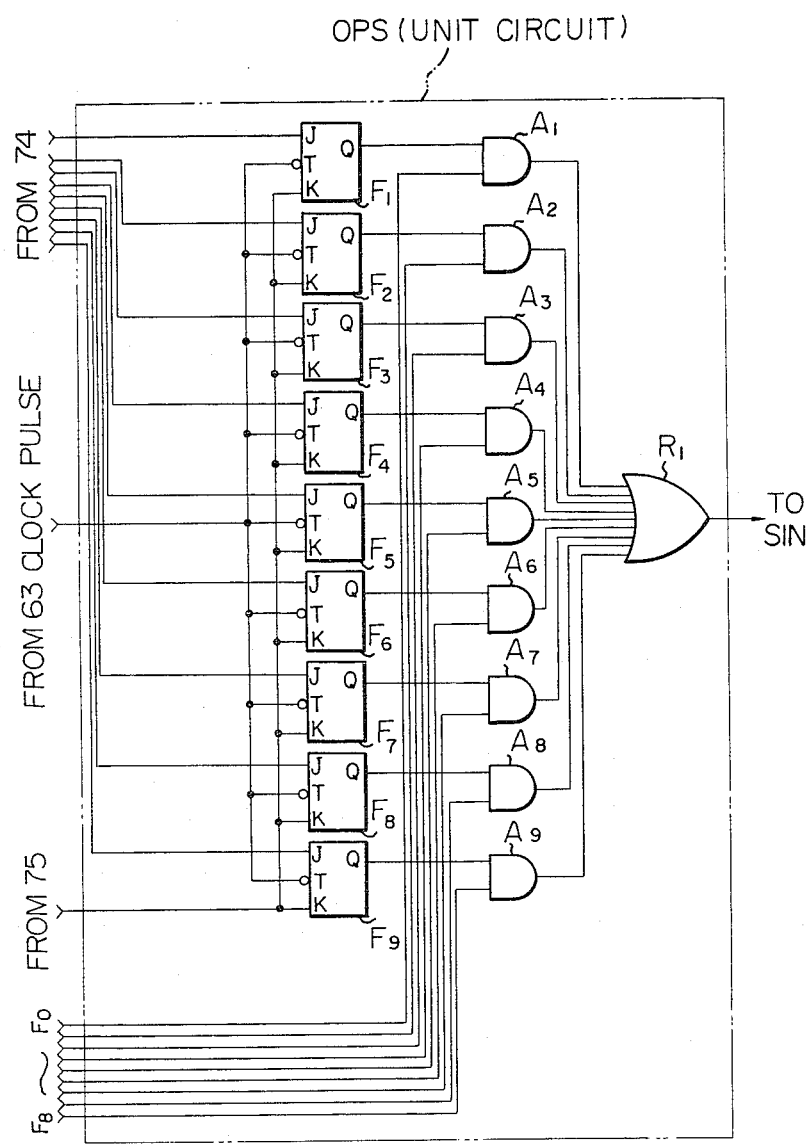
FIG. 3b is a block diagram showing details of a part of the control circuit.
Figure 3C:
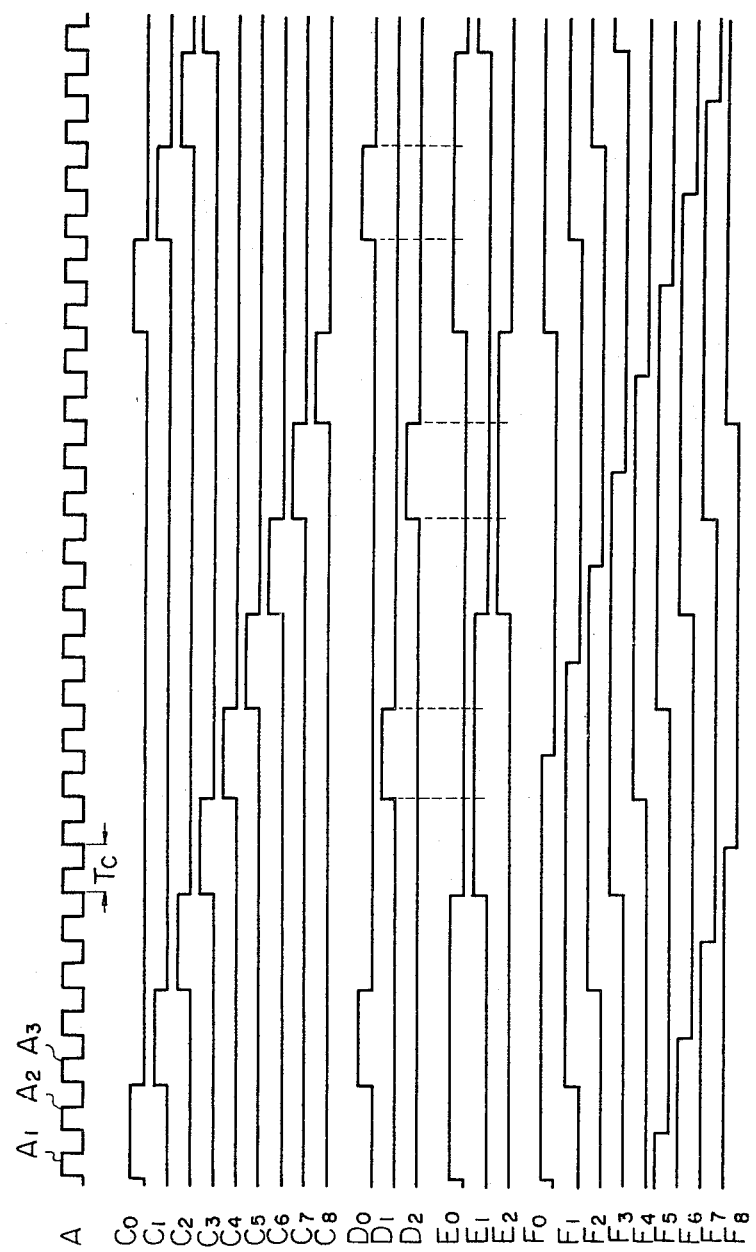
FIGS. 3c and 4 are timing charts representing input and output signals of various portions of the FIG. 3a circuit.

FIG. 3a is a circuit diagram of a charge timing setting apparatus embodying the present invention in a preferable manner. FIG. 3b shows one block or unit circuit of an oscillation phase selecting circuit OPS included in the charge timing setting apparatus. Waveforms which are shown in FIG. 3c demonstrate signal input and output timing in various portions of the circuitry depicted in FIG. 3a.

The circuitry of FIG. 3a includes a control circuit 62 which is visible in a lower left portion of the drawing and comprises a microcomputer system made up of an input/output or I/O port 62a, a read only memory or ROM 62b, a random access memory or RAM 62c and a central processing unit or CPU 62d. The ROM 62b stores program data for controlling charge timing setting operations and recording operations. Synchronous operation of the overall circuitry is based on clock pulses A generated by a clock pulse generator 63 at a frequency of 1.8 MHz. The clock pulses A are coupled to the I/O port 62a of the control circuit 62, a 9-bit counter 64 and an 18-bit counter 65.

The output of the 9-bit counter 64 is connected to a first decoder 67. The decoder 67 has output terminals 0–8 which produce output signals $B_0$–$B_8$. The output $B_0$ of the decoder 67 is fed to a T-type flip-flop $68_1$ whose Q output is in turn fed to an 8-bit serial-in, parallel-out shift register $68_2$. As viewed in FIG. 3c, the parallel outputs $F_1$–$F_3$ of the shift register $68_2$ and an output $F_0$ of the flip-flop $68_1$ produce pulses at a frequency 1/18 times the frequency of the clock pulses A which have phases which are shifted progressively by the period 2Tc of the clock pulses A. The pulses $F_0$–$F_8$ are transformed into sinusoidal waves and one of them is selected for driving an electrostrictive element of an ink jet head. The pulses $F_0$–$F_8$ will be selected in succession to shift the oscillation phase of the ink pressure. These pulses $F_0$–$F_8$ are constantly coupled to the oscillation phase selection circuit OPS (comprising first to sixtieth unit circuits).

As shown in FIG. 3b, each unit circuit of the oscillation phase selector OPS comprises nine JK flip-flops $F_1$–$F_9$, nine AND gates $A_1$–$A_9$ and one OR gate $R_1$. The flip-flops $F_1$–$F_9$ are sequentially set so that the AND gates $A_1$–$A_9$ are turned on one by one allowing the output pulses $F_0$–$F_8$ from the flip-flop $68_1$ and shift register $68_2$ to pass set by set therethrough. Output pulses of the AND gates $A_1$–$A_9$ are further passed through the OR gate $R_1$ to a sinusoidal wave converter SIN. When one of the flip-flops ($F_3$ for instance) is set one of pulses ($F_2$) will pass through the AND gate $A_3'$. Thus, the oscillation phase selector OPS not only serves to selectively produce the oscillation drive pulses $F_0$–$F_8$ but has a latching function. The output of each unit circuit (FIG. 3b) of the oscillation phase selector OPS is fed to the respective unit circuit of the sinusoidal wave converter SIN (having 60 unit circuits) and thereby transformed into a sinusoidal wave of a given peak value. The unit circuits of the converter SIN feed their outputs to corresponding oscillation voltage amplifiers (piezodrivers) $69_1$–$69_{60}$. Output voltages of these amplifiers $69_1$–$69_{60}$ are fed to electrostrictive vibrators of the respective associated ink jet heads $1_1$–$20_3$.

Meanwhile, the 18-bit counter 65 counts the output pulses of the clock pulse generator 63 and feeds its output to a second decoder 70. The second decoder 70 produces pulses $C_0$–$C_8$ at timings shown in FIG. 3c; a pulse $C_0$ at an output terminal 0 when the count is "0", a pulse $C_1$ at an output terminal 1 when the count is "1", etc.

Output pulses appearing at output terminals 1, 4 and 7 of the decoder 70 will be applied as charging search pulses $D_0$–$D_2$ to individual AND gates $A_{10}$–$A_{12}$ during a search for the separation phase of ink droplets so as to charge ink droplets which will be ejected from a first group of ink jet heads $1_1, 2_1, 3_1, 4_1, \ldots 20_1$, a second group of ink jet heads $1_2, 2_2, 3_2, \ldots 20_2$ and a third group of ink jet heads $1_3, 2_3, 3_3, \ldots 20_3$. The AND gate $A_{10}$ will be turned on by the control circuit 62 when the separation phases of ink droplets ejected from the first group of ink jet heads $1_1, 2_2, 3_1, \ldots 20_1$ are to be detected; the AND gate $A_{11}$ will be turned on by the control circuit 62 when the separation phases of ink droplets ejected from the second group of ink jet heads $1_2, 2_2, 3_2, \ldots 20_2$ are to be detected; and the AND gate $A_{12}$ will be turned on by the control circuit 62 when the separation phases of ink droplets ejected from the third group of ink jet heads $1_3, 2_3, 3_3, \ldots 20_3$ are to be detected. Output pulses of the AND gates $A_{10}$–$A_{12}$ are passed through an OR gate $R_2$ to an input terminal of each unit circuit of a selector circuit 71 (comprising first to twentieth unit circuits). Each unit circuit of the selector 71 is actuated during a separation phase search by a search command signal from the control circuit 62 to operate in a mode wherein the output of the OR gate $R_2$ will be connected to the charging electrodes 41–60. The selector 71 will remain in a mode to apply outputs of voltage amplifiers $72_1$–$72_{20}$ to the charging electrodes 41–60 as long as the search command output of the control circuit 62 is absent.

Outputs $C_0$–$C_2$ appearing at output terminals 0–2 of the decoder 70 are fed through an OR gate $R_3$ to input terminals of AND gates $A13_1, A14_1, \ldots A32_1$ constituting a first AND gate group; outputs $C_3$–$C_5$ at output terminals 3–5 are coupled through an OR gate $R_4$ to input terminals of AND gates $A13_2, A14_2, \ldots A32_2$ constituting a second AND gate group; and outputs $C_6$–$C_8$ at output terminals 6–8 of the decoder 70 are coupled through an OR gate $R_5$ to input terminals of AND gates $A13_3, A-_3, \ldots A32_3$ constituting a third AND gate group. As seen in FIG. 3c, outputs $E_0$, $E_1$ or $E_2$ of the OR gates $A_3$, $A_4$ or $A_5$ have a pulse duration or period three times that of the corresponding search pulses $D_0$, $D_1$ or $D_2$ with the intermediate third of the period corresponding therewith. The pulses $E_0$–$E_2$ will be used as charging pulses during recording.

Turning back to FIG. 2a, "m (=60)" ink jet heads are divided into "n (=3)" groups while "n (=3)" adjacent heads constitute one head section; the total number of head sections is m/n=20. The heads $1_1$–$1_3$ constitute a first head section which faces the charging electrode 41, the heads $2_1$–$2_3$ a second head section facing the charging electrode 42, and so on. One charging electrode and one charge detecting electrode are associated with each of the head sections. Similarly, the AND gates $A13_1$–$A32_3$ are divided into 20 sections; a first section $A13_1$–$A13_3$, a second section $A14_1$–$A14_3, \ldots A32_1$–$A32_3$.

Under the control of the control circuit 62, printing data of one line (40×60=2400 bits) is fed serially to a shift register 73 (to increase the data input rate, the data may be fed in a 2400 bit parallel mode.) The shift register 73 is designed to output 40 groups of data, each comprising 60 parallel bits. In other words, the shift register 73 has 60 parallel output terminals, one for each parallel bit. The 60 output terminals are connected to the AND gates $A13_1, A13_2, A13_3, A14_1, \ldots A32_3$ respectively. During recording operation, the data in the shift register 73 is applied 60 bits at a time from the output terminals to the corresponding AND gates $A13_1$–$A32_3$ in parallel. Each of the AND gates $A13_1$–$A32_3$ is supplied with 40 serial bits of printing data during one line of recording operation. During this period, the AND gates $A33_1$–$A33_{20}$ are all turned on by the control circuit 62 so that one line of data is applied to the voltage amplifiers $72_1$–$72_{20}$ in 40 serial groups.

First and second data selectors 74 and 75 are also included in the circuitry to shift and fix the driving phase of each ink jet head $1_1$–$20_3$ for the purpose of searching for and setting the separation phase of ink into droplets. The first data selector 74 has an input terminal connected to nine output lines of the I/O port 62a of the control circuit 62 and 60 sets of nine output terminals each. The nine output lines in each output terminal set are connected to the respective unit circuits of the oscillation phase selector OPS (see FIG. 3b). The data selector 74 also has 60 selection control input terminals 0–59. When the input voltage at the control input terminal 0 is high or "1", the input (nine lines) will be connected to the first unit circuit of the selector OPS. When the input voltage at the control input terminal 1 is "1", the 9-line input will be connected to the second unit circuit of the selector OPS, etc.

The second data selector 75 operates in substantially the same way as the selector 74 but has only one input line adapted to reset the flip-flops $F_1$–$F_9$ (FIG. 3b) and, therefore, 60 output lines. A decoder 76 feeds selection control signals to the control input terminals 0–59 of the first and second data selectors 74 and 75. The decoder 76 is supplied with count codes from a 60-bit counter 77 which is in turn supplied with count pulses from the circuit 62. Supposing that a count code fed from the counter 77 to the decoder 76 is zero, the level at the output terminal 0 of the decoder 76 is high or "1" causes the first and second data selectors 74 and 75 to establish connection therethrough between the first unit circuit of the selection circuit OPS and the control circuit 62. When the control circuit 62 supplies one pulse to the counter 77, the data selectors 74 and 75 connect the second unit circuit of the OPS to the control circuit 62. As another pulse is fed to the counter 77, the data selectors 74 and 75 connect the third unit circuit of the OPS to the control circuit 62. In this way, the respective unit circuits of the phase selector OPS are sequentially connected to the control circuit 62 every time the counter 77 counts up.

Output terminals of the charge detecting electrodes 21–40 are connected to input terminals of individual switching elements (20 elements) constituting an analog switching circuit 78 (having 20 sets of unit analog switching circuits connected to one output terminal). The switching circuit 78 has 20 selection control input terminals 0–19. The output terminal of the switching circuit 78 is connected to an input terminal of an amplifier 79 adapted to convert a charge detection signal into a binary signal. The amplifier 79 has its output terminal connected to the input line of the I/O port 62a of the circuit 62. The operation of the switching circuit 78 is substantially similar to that of the first and second data selectors 74 and 75. Every time the circuit 62 supplies one pulse to a 20-bit counter 80, the output of a decoder 81 changes, connecting the charge detecting electrodes 21–40 sequentially and selectively to the amplifier 79. A 40-bit counter 66 counts the output pulses ($F_0$) of a binary counter 68 and supplies a count code to a digital-to-analog or D/A converter 82. The D/A converter 82 produces an analog staircase voltage which rises 40 steps, returns to the lowermost level and again rises in a stepwise manner. This analog voltage is amplified by a voltage amplifier 83 to a level high enough to deflect charged ink droplets by 40 steps in a horizontal plane. The output of the voltage amplifier 83 is connected to 20 switching type amplifiers $72_1$–$72_{20}$. These amplifiers $72_1$–$72_{20}$ feed the amplified output of the amplifier 83 to the selector 71 when the output levels of the corresponding AND gates $A33_1$–$A33_{20}$ are high or "1". As the count of the 40-bit counter 66 reaches "40", a NAND gate 84 detects it and delivers a "1" signal to the control circuit 62. Based on this pulse which indicates a counting period, the control circuit 62 causes print data to be written in and read out of the register 73 for recording and the AND gates $A33_1$–$A33_{20}$ to be turned on at proper timing.

The circuitry of FIG. 3a operates as follows.

When a signal indicative of searching and setting of a separation phsae of ink into droplets arrives at the I/O port 62a of the control circuit 623, a separation phase searching and setting program is read out of the ROM 62b. Based on this program, the circuitry starts searching for and setting a separation phase of ink ejected from the respective ink jet heads $1_1$–$20_3$ into ink droplets. First, the counters 64–66, 77 and 80 are cleared by an output of the control circuit 62 and all of the unit circuits (1–20) of the selector circuit 71 are supplied with a search command signal from the control circuit 62. Then, in response to clock pulses $A_1$, $A_2$, $A_3$, ... appearing thereafter, various signals A, $C_0$–$C_8$, $D_0$–$D_2$, $E_0$–$E_2$ and $F_0$–$F_8$ are produced at timings shown in FIG. 3c.

Count codes from the thus cleared counters 77 and 80 are "0" and, accordingly, the decoders 76 and 81 produce "1" at their output terminals 0. Therefore, the data selectors 74 and 75 establish connection between the output line of the output circuit 62 and the first unit circuit of the oscillation phase selector OPS whereas the analog switching circuit 78 connects the charge detecting electrode 21 to the amplifier 79. Under this condition, the control circuit 62 turns on the AND gate $A_{10}$ to apply a charge searching pulse $D_0$ to the charging electrode 41 and thereby monitor an output signal of the charge detecting electrode 21.

(a) Where the output signal of the electrode 21 indicates a non-charged state of the ink droplets, a reset pulse is delivered to the line connected with the data selector 75 to reset all of the flip-flops $F_1$–$F_9$ of the first unit circuit of the OPS. Then, of the nine signal lines connected to the data selector 74, the fist one is made high or "1" in level thereby setting the flip-flop $F_1$. This supplies the first unit circuit of the sinusoidal wave converter SIN with a drive pulse $F_0$ of the first phase through the AND gate $A_1$ (FIG. 3b). If the output signal of the charge detecting electrode 21 still indicates the non-charged state, the control circuit 62 feeds a reset pulse to the data selector 75 to reset the flip-flops $F_1$–$F_9$ of the phase selector OPS. Thereupon, of the nine signal lines connected to the data selector 74, the second signal line is made "1" so as to set the flip-flop $F_2$. Then a drive pulse $F_1$ of the second phase is supplied through an AND gate $A_2$ to the first unit circuit of the converter SIN. The control circuit 62 again monitors the output of the charge detecting electrode 21. In this way, until the output signal of the electrode 21 indicates a changed state, the flip-flops $F_1$–$F_9$ of the phase selector OPS (FIG. 3b) are set in succession so that the first unit circuit of the converter SIN is applied with the drive pulses $F_0$–$F_8$ sequentially. Stated another way, the ink jet head $1_1$ included in the first group of the first section has its oscillation voltage phase shifted progressively. While the ink jet head $1_1$ is being supplied with an oscillation voltage of a certain phase in response to one of the drive pulses $F_0$–$F_8$, the separation phase of ink at the head $1_1$ will coincide with the charge pulse $D_0$ causing ink droplets to be charged. At the instant the charged state is detected, the phase shifting operation will be interrupted to complete setting of the separation phase at the head $1_1$.

(b) Where the output of the charge detecting electrode 21 has indicated the charged state from the start, droplets of ink ejected from the head $1_1$, $1_2$, or $1_3$ of the first section have been charged by the charge pulse $D_0$. It is sometimes impossible, therefore, to immediately decide whether the droplets from the head $1_1$ are charged. In such a case, the control circuit 62 first supplies one pulse to the counter 77 to connect itself to the second unit circuit of the phase selector OPS whereby the phase of the oscillation voltage fed to the head $1_2$ is shifted sequentially as in the phase shift operation of case (a). In the event the state has changed from charged to non-charged, the control circuit 62 allows the counter 77 to count up to designate the first unit circuit of the phase selector OPS and again connects itself to the first unit circuit of the phase selector OPS thereby shifting and setting the phase as in the case (a). If the state has remained charged without becoming non-charged, the control circuit 62 supplies another pulse to the counter 77 (the count is "2" in this case) and connects itself to the third unit circuit of the phase selector OPS. Then the voltage fed to the ink jet head $1_3$ is shifted in phase progressively. If this changes the state from charged to non-charged, the counter 77 will be caused to count up to designate the first unit circuit of the phase selector OPS and the control circuit 62 will be connected again to the first unit circuit of the phase selector OPS to shift and set the phase as in the case (a). If the state has remained charged, searching and setting of a separation phase at the head $1_1$ is considered completed because such a condition suggests coincidence of the current phase of oscillation voltage with the charge pulse $D_0$.

By the procedure discussed in (a) or (b), setting is completed of the separation timing of ink ejected from the ink jet head $1_1$ included in the first group of the first section into droplets of ink.

Thereafter, the control circuit 62 turns off the AND gate $A_{10}$ and turns on the AND gate $A_{11}$ to supply the charging electrode 41 with a charge pulse $D_1$ while setting "1" in the counter 77 in order to monitor the output of the charge detecting electrode 21. The count "1" designates the second unit circuit of the phase selector OPS. When the output of the electrode 21 indicates the non-charged state, the voltage fed to the head $1_2$ will be shifted in phase sequentially as in the case (a). If the output of the electrode 21 indicates the charged state, droplets of ink ejected from the head $1_2$ or $1_3$ will be considered charged since in this case the phase setting of the head $1_1$ has been completed and the charge pulse $D_1$ cannot charge the ink droplets from the head $1_1$. Accordingly, the control circuit 62 first supplies one pulse to the counter 77 to increase the count to "2" and connects itself to the third unit circuit of the phase selector OPS. The phase of the oscillation voltage fed to the head $1_3$ is sequentially shifted to monitor the state. If it has changed state from charged to non-charged, the count of the counter 77 returns to "1" and the voltage fed to the head $1_2$ has its phase shifted sequentially as in case (a). If the state has remained charged without becoming non-charged, phase shifting is needless because it indicates coincidence of the current separation phase of ink from the head $1_2$ with the charge pulse $D_1$.

This completely sets the timing for ink ejected from the ink jet head $1_2$ of the second group of the first section to be separated into droplets.

Next, the control circuit 62 turns off the AND gate $A_{11}$ and turns on the AND gate $A_{12}$ to supply a charge pulse $D_2$ to the charging electrode 41. The counter 77 count becomes "2" indicative of the third unit circuit of the phase selector OPS and the control circuit 62 monitors the output of the charge detecting electrode 21. If the charged state is indicated, the control circuit 62 will not perform shifting of the separation phase of ink from the head $1_3$ because it means that setting of the oscillation phases of the heads $1_1$ and $1_2$ has been completed ($D_0$, $D_1$) and, in these phases, the charge pulse $D_2$ cannot charge ink droplets ejected from the heads $1_1$ and $1_2$. This is because droplets from the head $1_3$ have been charged by the drive pulse $D_2$. This is the end of the operation for setting the separation timing of ink ejected from the head $1_3$ included in the third group of the first section. Thus, all of the heads $1_1$–$1_3$ of the first section have the phases of voltages fed thereto now completely set.

Then the control circuit 62 supplies one pulse to the counter 80 to set "1" therein and alters the mode of the analog switch 78 to a mode which connects the output terminal of the charge detecting electrode 22 to the input terminal of the amplifier 79. This is followed by a procedure similar to the one discussed in connection with the first section of heads $1_1$, $1_2$ and $1_3$. Searching and setting of oscillation voltage phase is carried out on the heads $2_1$, $2_2$ and $2_3$ of the first, second and third groups of the second section. In the same way, voltage phases for the heads $3_1$–$20_3$ of the third to the twentieth sections will be searched for and set in succession. Thereafter, a recording control program is unloaded from the ROM 62b and, based on this program, a timing indication signal is made high or "1" indicating "recording (entry of print data) enabled". Timing pulses for receiving print data are then applied to a data transmitting unit (not shown). Also, all of the unit circuits 1–20 of the selector circuit 71 are switched over to the amplifiers $72_1$–$72_{20}$.

Figure 4:
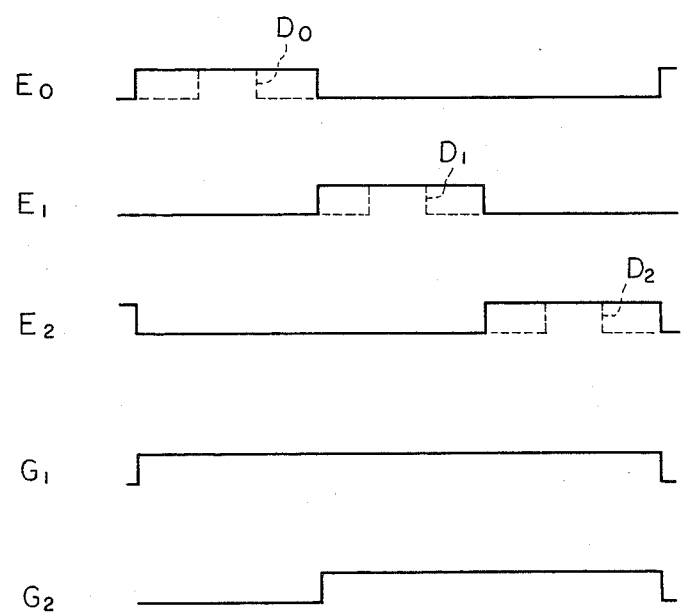

As print data is delivered to the system, the control circuit 62 stores one line of print data in the shift register 73 by counting timing pulses or by receiving line sync pulses from the transmitter. Then the control circuit 62 conditions the shift register 73 for data read-out operation whereafter it supplies the shift register 73 with short duration shift clock pulses synchronized with one output pulse ($F_0$) of the binary counter 68, with an output pulse of the NAND gate 84 as a starting point. Simultaneously, the control circuit 62 keeps the AND gates $A33_1$–$A33_{20}$ turned on until the next output pulse of the NAND gate 84 arrives at the control circuit 62. This delivers 40 bit print data serially to each of the AND gates $A13_1$–$A32_3$. The AND gates $A13_1$, $A14_1$, ... $A32_1$ of the first group are supplied with a recording charge pulse $E_0$ synchronous with the charge pulse $D_0$ from the OR gate $R_3$. The AND gates $A13_2$, $A14_2$, ... $A32_2$ of the second group are supplied with a recording charge pulse $E_1$ synchronous with the charge pulse $D_1$ from the OR gate $R_4$, and the AND gates $A13_3$, $A14_3$, ... $A32_3$ of the third group are supplied with a recording charge pulse $E_2$ synchronous with the charge pulse $D_2$ from the OR gate $R_4$. Accordingly, when the print data fed to the AND gates $A13_1$, $A13_2$ and $A13_3$ is high or "1" indicating "recording", the output of the AND gate $A33_1$ takes the form of a pulse whose duration is long enough to charge ink droplets ejected from all of the heads $1_1$, $1_2$ and $1_3$ as represented by a waveform $G_1$ in FIG. 4. When print data of the low or "0" level is coupled only to the AND gates A13 of the first group, the output of the AND gate $A33_1$ takes the form of a short pulse whose duration is as shown at $G_2$ in FIG. 4, so that none of the droplets from the head $1_1$ are charged. As will now be appreciated, since the timing for charging ink droplets from the three heads $1_1$, $1_2$ and $1_3$ is determined by the recording charge pulses $E_0$–$E_2$, ink droplets from individual heads can be selectively charged according to print data despite the common use of the charge electrode 21 for the three different heads $1_1$, $1_2$ and $1_3$.

The foregoing procedures for searching for and setting separation phases of ink into droplets and for recording as well as the operating sequence are carried out on the basis of a program stored in the ROM 62b of the control circuit 62.

The object of the present invention can be achieved with the above arrangement and procedure. Although the present invention has been described in connection with a specific construction and a specific embodiment, it is not restrictive but only illustrative. For instance, the numbers m and n of the heads and groups are not limited to 60 and 3 as shown and described. Extensive studies show that $2 \leq n \leq 4$ is most practical at the present stage.

In the embodiment shown and described, separation phases of ink into droplets are controlled by shifting the phases of voltages applied to electrostrictive vibrators by way of example. The separation phases can also be varied in accordance with the levels of the voltages applied to the electrostrictive vibrators. Therefore, the phase control may be replaced by level control for searching and setting of separation phases. Furthermore, one charging electrode and one charge detecting eletrode may be alloted to each ink ejection nozzle and "n" of them may be connected in common with each other.

Various other modifications will become possible for those skilled in the art after receiving the teachings of the present disclosure without departing from the scope thereof.

What is claimed is:

1. An ink jet printing apparatus comprising first and second ink jet heads for ejecting first and second jets of ink respectively at a predetermined frequency of pressure oscillation so that the first and second ink jets separate into droplets at a predetermined position and one charging electrode means for applying a pulsating electric field to the first and second ink jets at said position to induce an electric charge thereon, the charging electrode means alternatively applying the pulsating electric field to the first and second ink jets at first and second different relative charging time phases; and control means for controlling the first and second ink jet heads to eject the first and second ink jets with first and second relative pressure oscillation time phases so that the first ink jet is charged by the pulsating electric field of the first charging time phase and the second ink jet is charged by the pulsating electric field of the second charging time phase.

2. An apparatus as in claim 1, further comprising one charge detecting means for detecting charges on the first and second ink jets, the control means being constructed to, prior to printing operation, control the charging electrode means to apply the pulsating electric field at the first charging time phase, progressively shift the pressure oscillation time phase of the first ink jet head and latch the pressure oscillation time phase of the first ink jet head at a present value which constitutes said first pressure oscillation time phase when the charge detecting means detects a charged condition of the first ink jet; and then control the charging electrode means to apply the pulsating electric field at the second charging time phase, progressively shift the pressure oscillation time phase of the second ink jet head and latch the pressure oscillation time phase of the second ink jet head at a present value which constitutes said second pressure oscillation time phase when the charge detecting means detects a charged condition of the second ink jet.

* * * * *